(12) United States Patent
Chen

(10) Patent No.: US 7,594,333 B2
(45) Date of Patent: Sep. 29, 2009

(54) GARDENING TOOL WITH RETAINING ASSEMBLY

(76) Inventor: Chang-Ying Chen, 235 Chung - Ho Box 8-24, Taipei (TW)

( * ) Notice: Subject to any disclaimer, the term of this patent is extended or adjusted under 35 U.S.C. 154(b) by 231 days.

(21) Appl. No.: 11/637,827

(22) Filed: Dec. 13, 2006

(65) Prior Publication Data

US 2008/0141540 A1    Jun. 19, 2008

(51) Int. Cl.
*B26B 13/26* (2006.01)
*B26B 13/06* (2006.01)

(52) U.S. Cl. ............................. 30/251; 30/249; 30/254; 30/257

(58) Field of Classification Search ........... 30/249–252, 30/254, 257, 259, 260
See application file for complete search history.

(56) References Cited

U.S. PATENT DOCUMENTS

| | | | | |
|---|---|---|---|---|
| 4,696,107 A | * | 9/1987 | Held ........................... 30/246 |
| 5,261,162 A | * | 11/1993 | Siegler ........................ 30/216 |
| 5,511,314 A | * | 4/1996 | Huang .......................... 30/251 |
| 5,634,276 A | * | 6/1997 | Lin ............................ 30/249 |
| 5,743,018 A | * | 4/1998 | Wang .......................... 30/249 |
| 5,970,617 A | * | 10/1999 | Chang ......................... 30/249 |
| 6,769,183 B2 | * | 8/2004 | Schmidt ...................... 30/250 |
| 2007/0119057 A1 | * | 5/2007 | Chen .......................... 30/249 |

* cited by examiner

*Primary Examiner*—Boyer D. Ashley
*Assistant Examiner*—Edward Landrum

(57) ABSTRACT

A gardening tool with a retaining assembly includes a first rod pivotally installed to a second rod; the first rod having a track for assembling a retaining portion; the first rod further having an elastic unit at a side having the track; the second rod being rotatably installed to the first rod; one end of the second rod being formed with a recess; and the retaining portion being movable in the track; the elastic unit resisting against the retaining portion so as to be buckled to the recess and thus an orientation of the second rod is fixed.

1 Claim, 5 Drawing Sheets

GARDENING TOOL WITH RETAINING ASSEMBLY

FIELD OF THE INVENTION

The present invention relates to branch cutters, and particularly to a gardening tool with a retaining assembly which has a simple structure and can be operated easily.

BACKGROUND OF THE INVENTION

A prior art branch cutter has a long handle and a tool portion. By pulling a rope, the tool portion will drive a cutting portion for cutting branches at a higher place. The user can cut the branch at a lower place. The user can operate the branch cutter easily.

The branch cutter is an effective tool to cut branches at higher places. However, a great arm of force is necessary for cutting a branch. Thus it is has a great volume. In the prior art the cutter is foldable for storage.

In one improvement structure, a plurality of gears are formed as a gear set. A screwing unit is installed on the gear set. When the screwing means is released, the gear set can be used to adjust the orientation of the tool portion. Then the screw is tightened for achieving the objects of folding and extension.

However, above mentioned structure has a complicated structure and the gear set is very complicated. In use of the branch cutter, the screwing unit must be tightened and released repeatedly. Thus a hand tool for driving the screwing unit is necessary and as a result, the user feels busy for further adjusting the state of the branch cutter. The prior art branch cutter is needed to be improved.

SUMMARY OF THE INVENTION

Accordingly, the primary object of the present invention is to provide a gardening tool with a retaining assembly which has a simple structure and can be operated easily.

To achieve above objects, the present invention provides a gardening tool with a retaining assembly which comprises a first rod pivotally installed to a second rod; first rod having a track for assembling a retaining portion; the first rod further having an elastic unit at a side having the track; the second rod being rotatably installed to the first rod; one end of the second rod being formed with a recess; and the retaining portion being movable in the track; the elastic unit resisting against the retaining portion so as to be buckled to the recess and thus an orientation of the second rod is fixed. A handle has a fixed cutting portion; the fixed cutting portion is pivoted with a movable cutting portion; the movable cutting portion is interacted with the first rod. The rope is connected to the second rod and the fixed cutting portion; a predetermined length of the rope extends out of the second rod to be pulled by a user. Pulling the rope will rotate the first rod and second rod to drive the movable cutting portion to move approach the fixed cutting portion so as to perform a cutting operation.

The various objects and advantages of the present invention will be more readily understood from the following detailed description when read in conjunction with the appended drawing.

BRIEF DESCRIPTION OF THE DRAWINGS

FIGS. 1-1 is a perspective view of a push unit of the gardening tool with a retaining assembly of the present invention in another direction.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
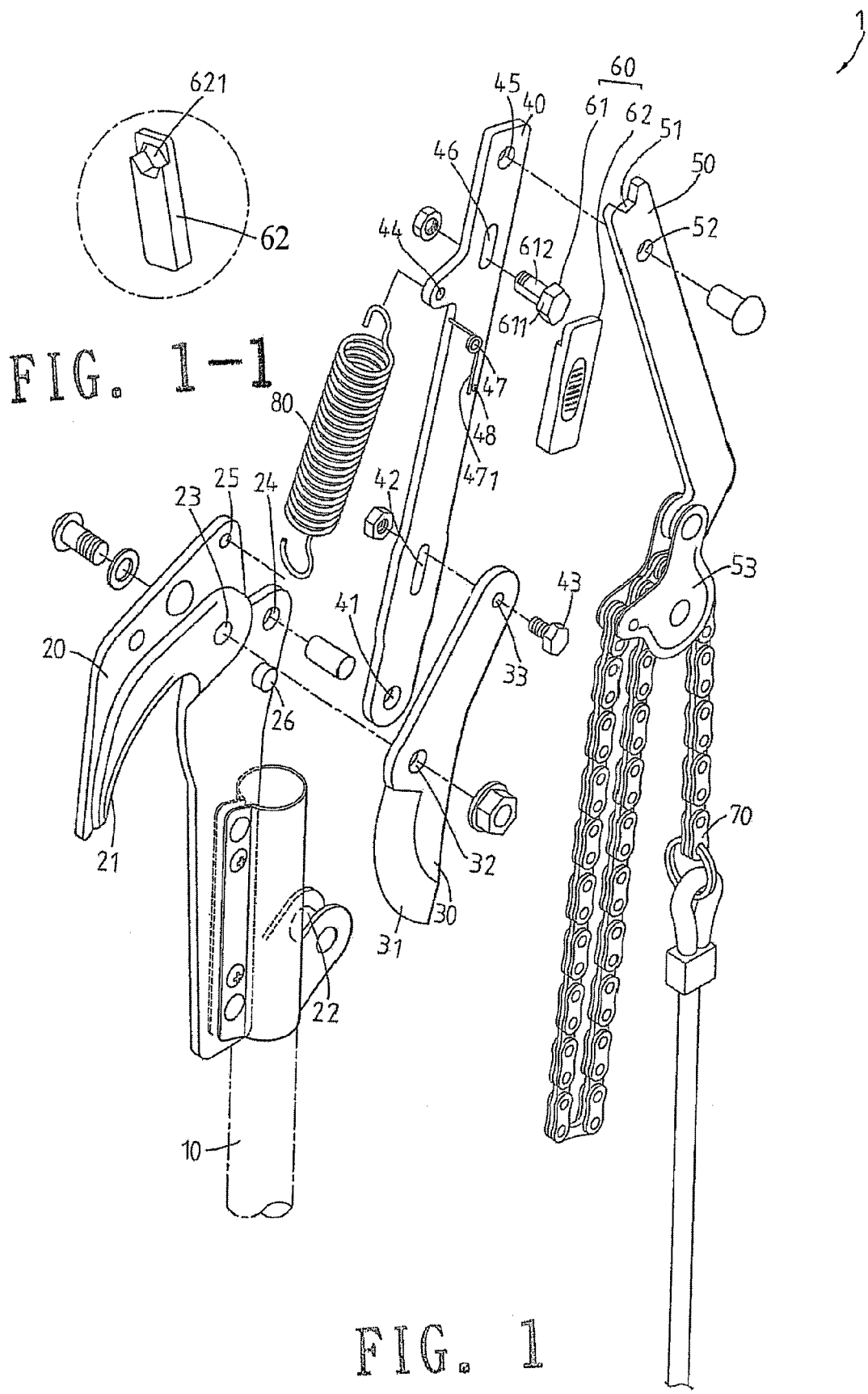
FIG. 1 is an exploded perspective view of the gardening tool with a retaining assembly of the present invention.
Figure 2:
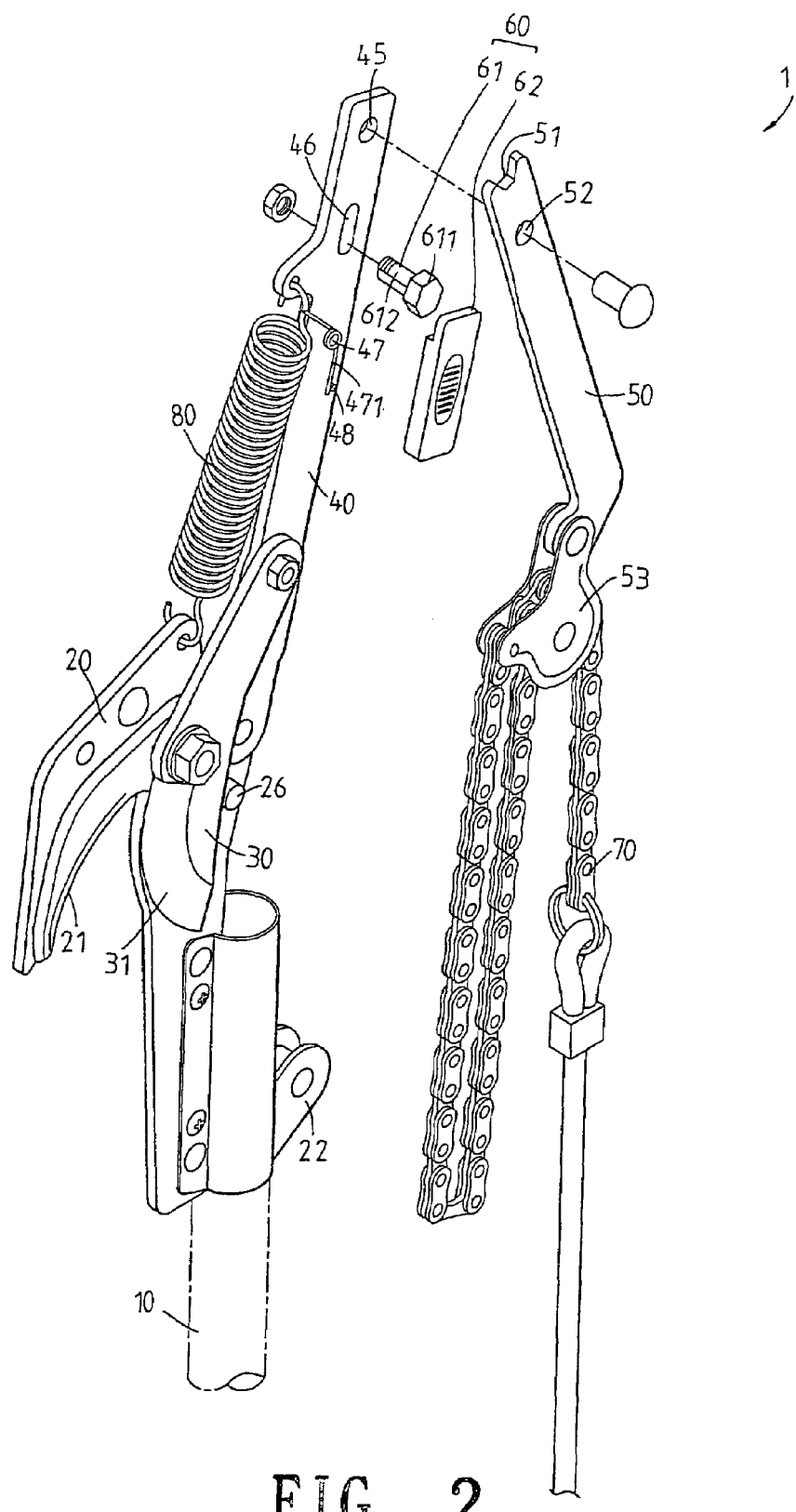
FIG. 2 shows the gardening tool with a retaining assembly illustrated in FIG. 1, which is viewed from another orientation.

Referring to FIGS. 1 and 2, the gardening tool with a retaining assembly of the present invention is illustrated. The assembly serves to cut the branches of a tree at a higher place.

A handle 10 has a long rod and has a predetermined length for being extended to a higher place.

A fixed cutting portion 20 has an approximate V shape. One end of the fixed cutting portion 20 is formed with a cutting surface 21 and another end thereof is connected to one end of the handle 10. A sleeve 22 is formed at the connection of the fixed cutting portion 20 and the handle 10 for receiving a rope 70. A middle section of the V shape fixed cutting portion 20 is formed with a first pivotal hole 23, a second pivotal hole 24, a third pivotal hole 25 and a limiting post 26.

A movable cutting portion 30 has an I shape. One end of the movable cutting portion 30 is formed with a cutting surface 31 corresponding to the cutting surface 21 of the fixed cutting portion 20. A middle section of the movable cutting portion 30 has a fourth pivotal hole 32 which is aligned to the first pivotal hole 23 of the fixed cutting portion 20 in an assembly state. The screw passes through the fourth pivotal hole 32 and the first pivotal hole 23 so that the movable cutting portion 30 is pivotally installed to the fixed cutting portion 20. The limiting post 26 retains the movable cutting portion 30 so that the movable cutting portion 30 rotates within a predetermined limit. Another end of the movable cutting portion 30 having no the cutting surface 32 is formed with a fifth pivotal hole 33.

A first rod 40 has an approximate I shape. One end of the first rod 40 has a sixth pivotal hole 41 which is aligned to the second pivotal hole 24 of the fixed cutting portion 20 by using a rod to pass therethrough. The first rod 40 is formed with a sliding groove 42 near the sixth pivotal hole 41. A stud 43 passes through the fifth pivotal hole 33 of the movable cutting portion 30 and the sliding groove 42 so that the movable cutting portion 30 is pivotally installed to the first rod 40. A middle section of the first rod 40 has a seventh pivotal hole 44. One end of the first rod 40 has a sixth pivotal hole 41 and the other end of the first rod 40 is formed with an eighth pivotal hole 45. The first rod 40 is formed with a track 46 near the eighth pivotal hole 45. An elastic unit 47 is formed aside the track 46. The elastic unit 47 is a twisting spring with two end arms 471. The first rod 40 has a projection 48 resisting against one end arm 471 of the elastic unit 47.

A second rod 50 has an approximate I shape. One end of the second rod 50 is formed with a polygonal recess 51. The second rod 50 has a ninth pivotal hole 52 near the recess 51. The second rod 50 is pivotally installed to the first rod 40 by a stud passing through the ninth pivotal hole 52 and the eighth pivotal hole 45 of the first rod 40. Thus, when the first rod 40 and second rod 50 are not locked, the orientation can be adjusted as in a non-locking position. The second rod 50 has an engaging portion 53 at one end without the recess 51.

A retaining portion 60 has a bolt 61 and a push unit 62. The bolt 61 may be a stud which has a polygonal resisting head 611 corresponding to the recess 51 and a rod 612 passing through the track 46. A backside of the push unit 62 has a trench 621. A part of the resisting head 611 is embedded into the trench 621 so as to enhance the fixedness of the present invention. The push unit 62 is thinner at a portion installed to the trench 621.

A rope 70 is a chain or a flexible rope. One end of the rope 70 passes through the engaging portion 53 of the second rod 50 and then passes through the sleeve 22 of the fixed cutting portion 20 and then is fixed to the engaging portion 53. The length of another end serves for being held by a user.

An elastic body 80 is a spring. Two ends of the elastic body 80 are fixed to the third pivotal hole 25 of the fixed cutting portion 20 and the seventh pivotal hole 44 of the first rod 40. The elastic body 80 serves for providing the function of restoring to the original position by the elastic force thereof.

Figure 3:
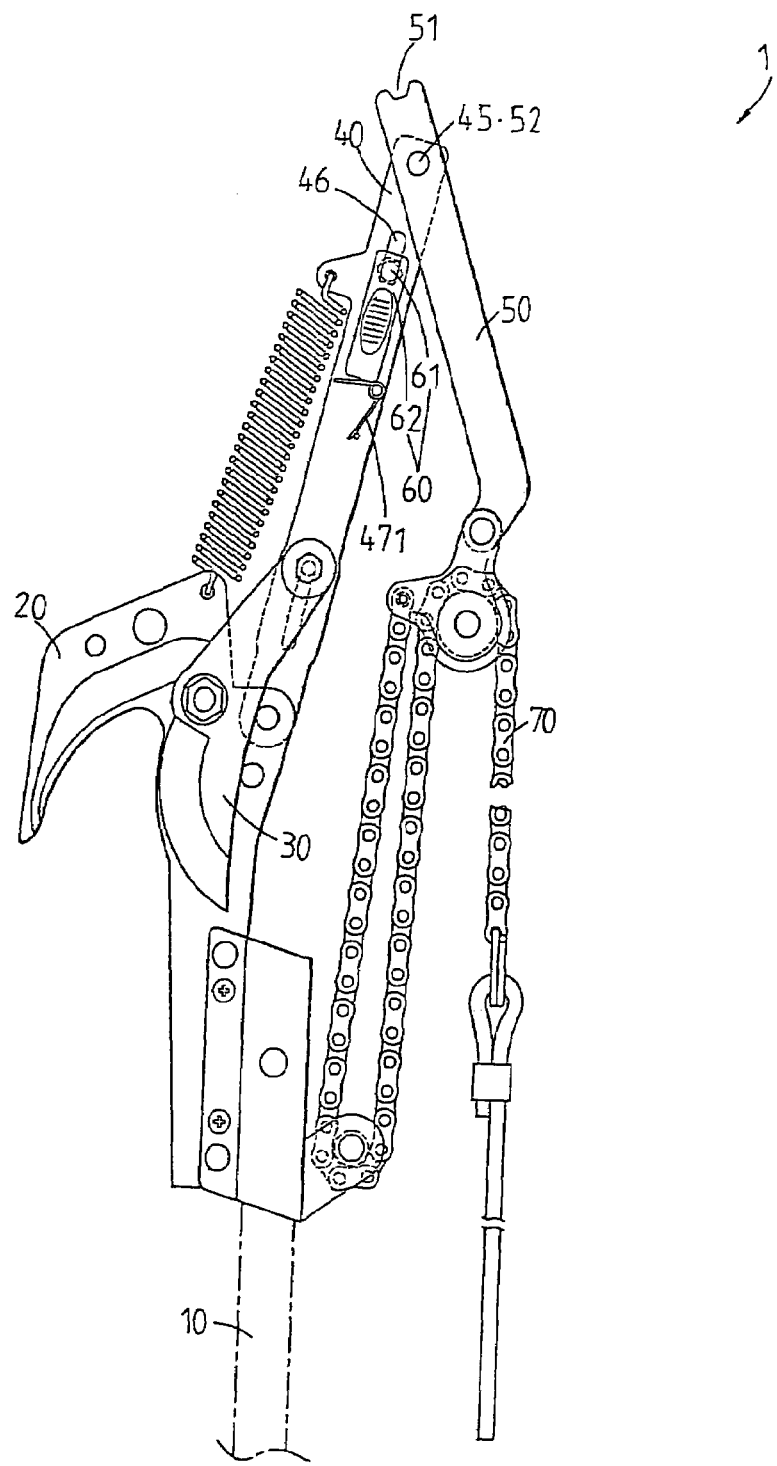
FIG. 3 shows a folding state of the gardening tool with a retaining assembly according to the present invention.
Figure 4:
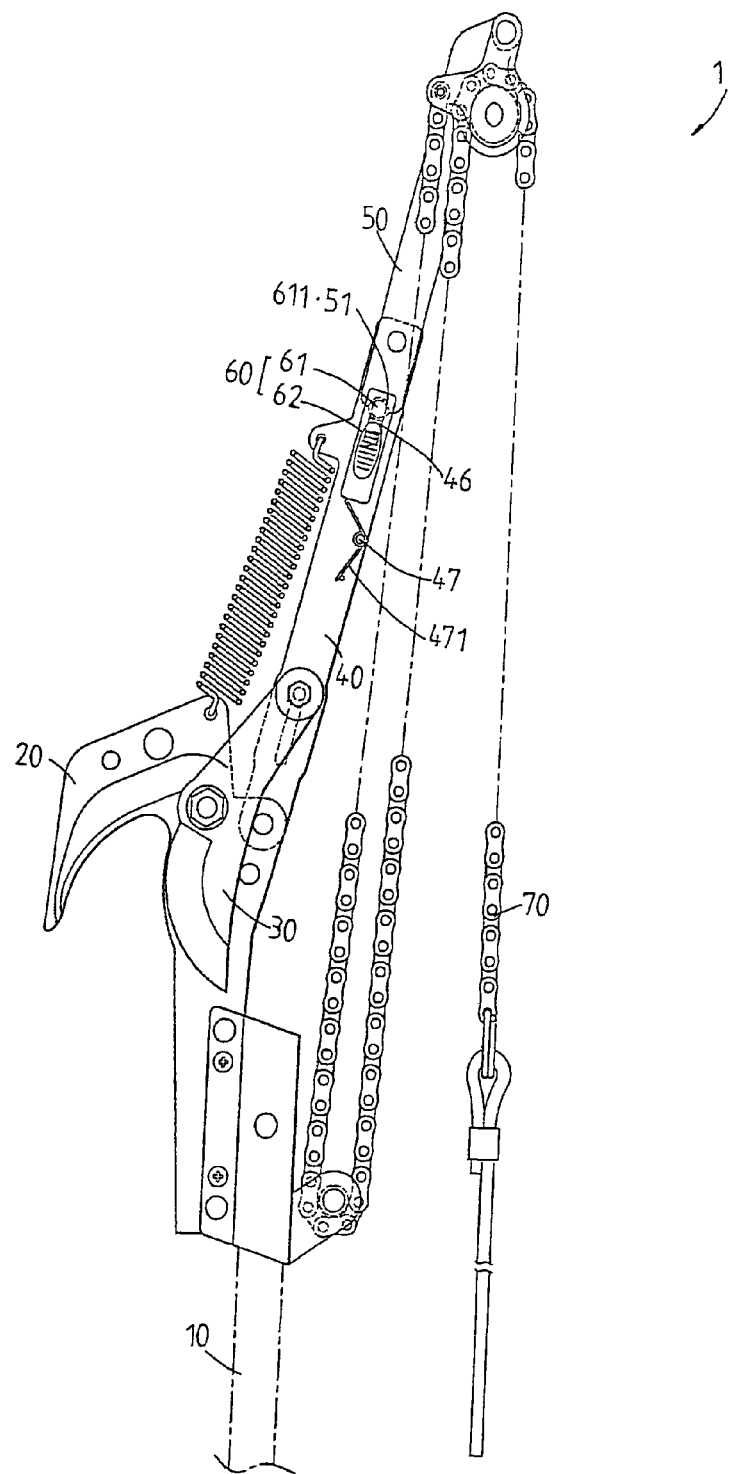
FIG. 4 shows an extension state of the gardening tool with a retaining assembly of the present invention.
Figure 5:
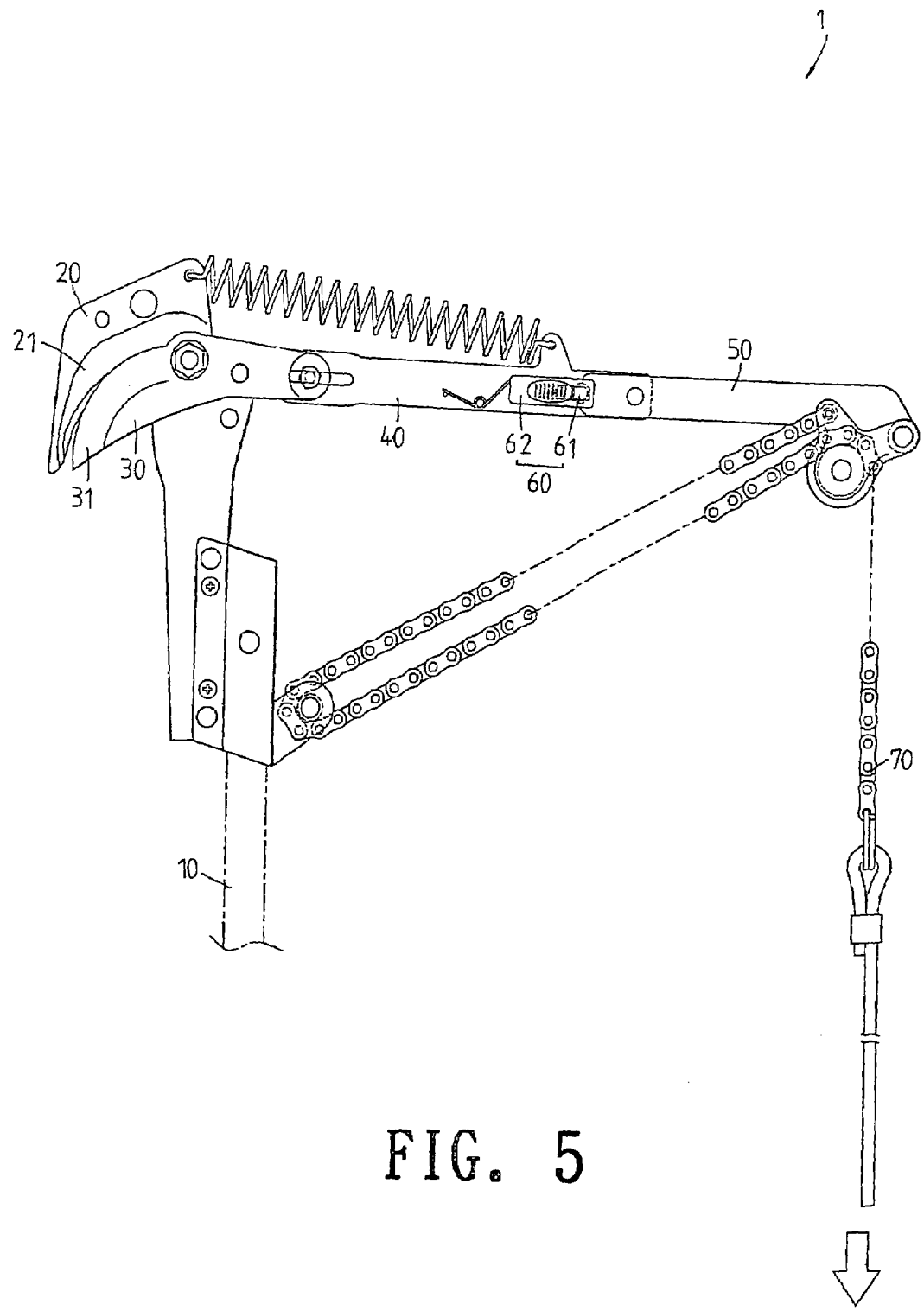
FIG. 5 is a schematic view showing the use of the gardening tool with a retaining assembly of the present invention.

Referring to FIGS. 3 to 5, the application of the present invention is illustrated.

FIG. 3 shows a folding state. The first rod 40 and second rod 50 are rotatable with respect to each other along the eighth pivotal hole 45 and the ninth pivotal hole 52 so that the first rod 40 and the second rod 50 are folded to have a smaller volume so that it can be carried easily. The handle 10 can be detached singly. However, above mentioned structure is known in the prior art and thus the detail will not be further described herein.

FIG. 4 shows the locking state of the present invention. When the user desires to operate the body 1, the second rod 50 can be moved so that the recess 51 of the second rod 50 will move closer to the retaining portion 60 and the push unit 62 and the bolt 61 to move along the track 46 to slide toward the elastic unit 47 so as to compress one end arm 471 of the elastic unit 47. Finally, the thinner portion of the push unit 62 resists against the resisting head 611 of the bolt 61. The push unit 62 is resisted by one end arm 471 of the elastic unit 47 to tightly enforce the bolt 61 to combine with the recess 51. Thus, the second rod 50 is locked to retain with a predetermined position and orientation with respect to the first rod 40. Therefore, a larger arm of force is provided to the first rod 40 and second rod 50. This is helpful to the users.

FIG. 5 shows the use of the present invention. The state of FIG. 5 is like that in FIG. 4, in that the first rod 40 and second rod 50 are locked to the same orientation and position by fixing the retaining portion 60 to a locking position. When the rope 70 is pulled, a great arm of force is provided so that the user can pull the rope 70 to drive the cutting surface 31 of the movable cutting portion 30 to move toward the cutting surface 21 of the fixed cutting portion 20 through the second rod 50 and first rod 40. The cutting surface 31 of the movable cutting portion 30 and the cutting surface 21 of the fixed cutting portion 20 serve for cutting an object.

When it is used and the body 1 is folded, the hand of the user can move the push unit 62 of the retaining portion 60 so that as illustrated in FIG. 3, it is at the direction that the track 46 moves approach to the elastic unit 47. Furthermore the bolt 61 is driven to the move to the place and thus the bolt 61 separates from the recess 51 of the second rod 50. Thus the second rod 50 can be folded as illustrated in FIG. 3.

The gardening tool with a retaining assembly of the present invention is suitable for any structure necessary to fold and extension. The present invention provides a locking way with a simple structure and an easy operation way.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A gardening tool with a retaining assembly comprising:
   a first rod; the first rod having a track; the first rod further having an elastic unit formed aside the track;
   a second rod pivotally installed to the first rod; one end of the second rod being formed with a recess; and
   a retaining portion movably assembled in the track, the retaining portion including a bolt passing through the track and a push unit selectively joined to the bolt, the bolt having a polygonal resisting head partially corresponding to the recess in the second rod, the push unit having a trench formed on a backside thereof for partially corresponding to the resisting head of the bolt;
   wherein when the elastic unit resists against the push unit of the retaining portion and the push unit resists against the bolt, the resisting head of the bolt is partially embedded into the trench in the push unit such that the bolt moves along the track and the resisting head of the bolt correspondingly combines with the recess in the second rod for fixing the second rod with the first rod.

* * * * *